Sept. 27, 1932.　　　M. G. IVANDICK　　　1,879,936
STEERING WHEEL MOUNTING
Filed Oct. 17, 1930　　　3 Sheets-Sheet 1

Inventor
M. G. Ivandick
By
Attorneys

Sept. 27, 1932.  M. G. IVANDICK  1,879,936
STEERING WHEEL MOUNTING
Filed Oct. 17, 1930   3 Sheets-Sheet 2
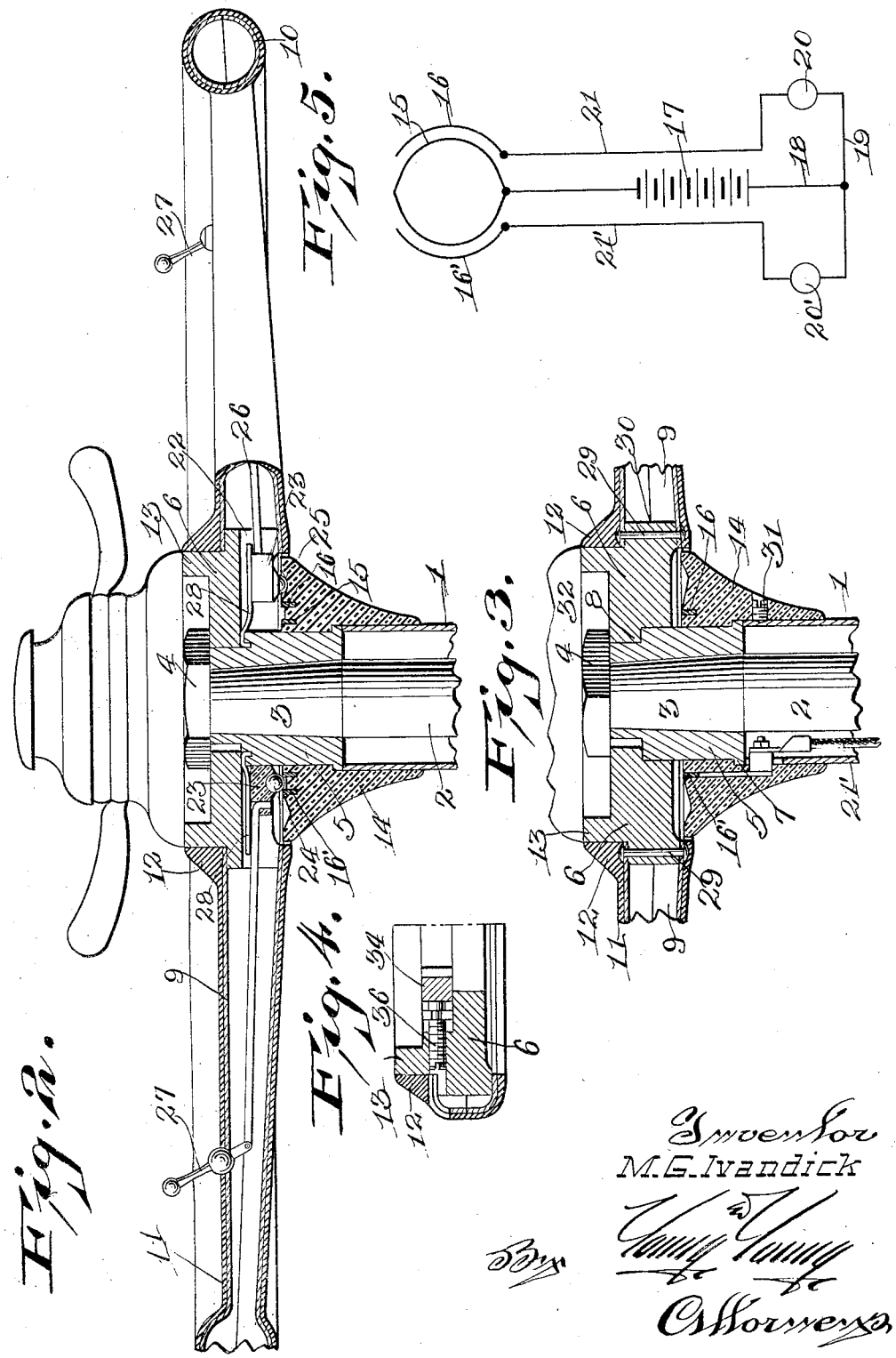
Inventor
M.G. Ivandick Sept. 27, 1932.　　　　M. G. IVANDICK　　　　1,879,936
STEERING WHEEL MOUNTING
Filed Oct. 17, 1930　　　3 Sheets-Sheet 3
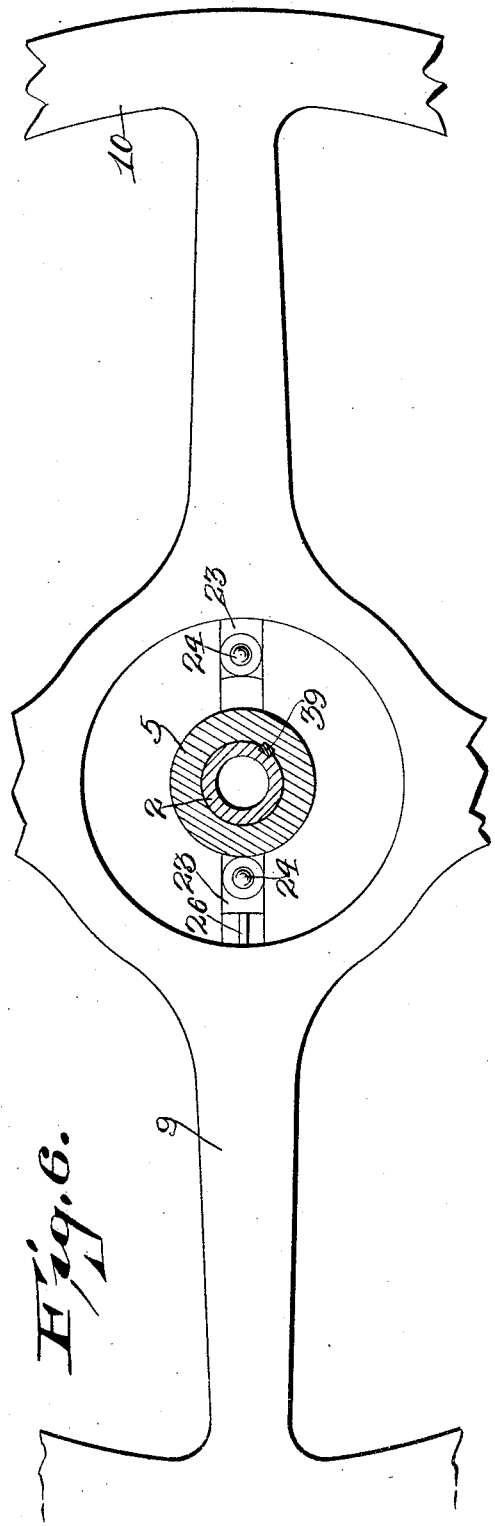
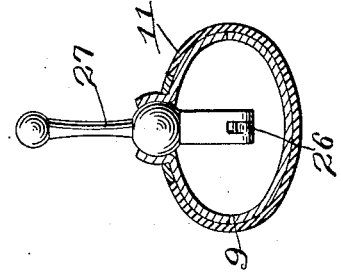
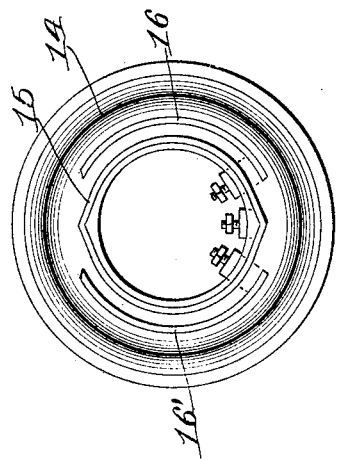
Inventor
M.G.Ivandick Patented Sept. 27, 1932

1,879,936

UNITED STATES PATENT OFFICE

MATHEW G. IVANDICK, OF WAUKEGAN, WISCONSIN

STEERING WHEEL MOUNTING

Application filed October 17, 1930. Serial No. 489,377.

This invention relates to improvements in steering wheel mountings.

One of the objects is the provision of a novel mounting for steering wheels embodying structure which constitutes an improvement over the structure disclosed in Patent #1,769,517, granted to me on July 1, 1930.

Another object of the present invention is the provision of an improved construction in the makeup of the steering wheel and the mounting thereof, whereby the wheel can be readily adjusted so that the signal levers used in connection with the improved circuit closure disclosed in Patent #1,769,517, can be properly positioned so that they will be disposed directly opposite each other and on a substantial horizontal plane with respect to the driver's seat, whereby these levers will be in position to be actuated by both hands of the driver.

A further object of the invention is the provision of steering wheel mountings, wherein the construction is improved over that in the above referred to patent, so as to provide a comparatively solid fitting at the upper end of the steering column and includes means whereby the wheel can be quickly disengaged from the steering post and adjusted, and quickly engaged with the post for retaining the wheel against movement relative to the post.

With the above and other objects in view, the invention consists in the novel features of construction, the combination and arrangement of parts hereinafter more fully set forth, pointed out in the claims and shown in the accompanying drawings wherein:

Figure 2 is a detailed transverse section taken through the major portion of the steering wheel;

Figure 3 is a view similar to Figure 2, taken at right angles thereto;

Figure 4 is a detailed section on the line 4—4 of Figure 1;

Figure 5 is a diagrammatic view of the wiring;

Figure 6 is a detailed horizontal section;

Figure 7 is a plan view of the trackways; and,

Figure 8 is a detailed transverse section through one of the spokes of the steering wheel.

Figure 1:
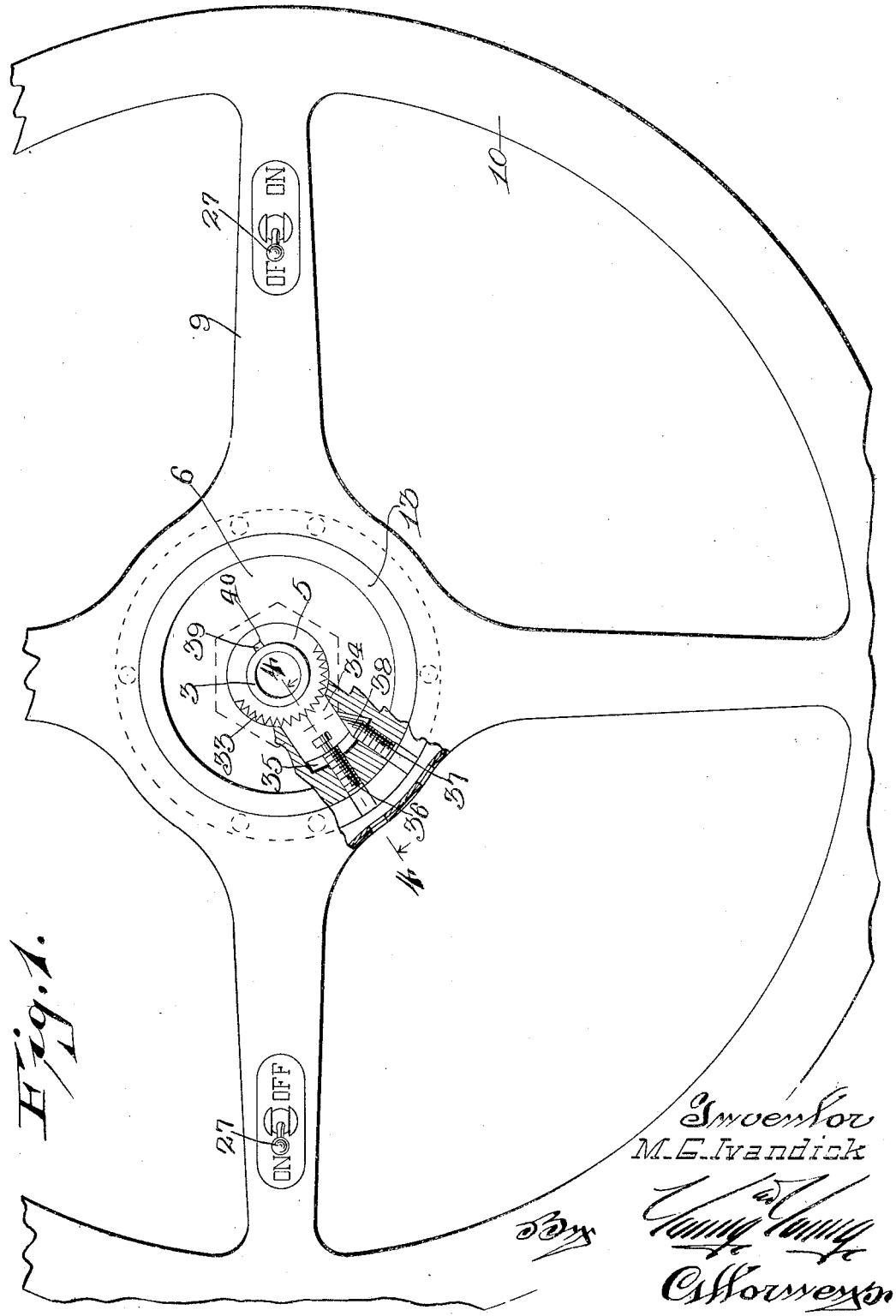
Figure 1 is a top plan view of a steering wheel embodying my improvement with parts thereof broken away and illustrated in cross section.

Referring more particularly to the drawings, 1 indicates the usual steering column in which the steering post 2 is arranged, said post having at its upper end a tapered portion 3 terminating into a threaded end upon which is mounted a nut 4. This nut 4 retains the sleeve 5 and hub 6 in position on the upper end of the steering post.

It will be noted in Figure 2 that the sleeve 5 is provided at its inner end with an annular flange 7 which rests upon the upper end of the steering column 1, while the upper end of the sleeve is provided with an annular shoulder engaged by an annular flange 8 on the hub 6. The body of the steering wheel comprises the spokes 9, and the rim 10 is preferably formed of two sections of stamped metal, and while the construction is preferably of stamped metal, it will be apparent that the sections can be formed by casting or in any other suitable manner.

In Figure 8, it will be noted that each of the spokes 9 is formed of two separable sections and this is also true of the outer hand rim 10. Both the spokes and the hand rim are provided with a covering 11 of a suitable composition material and this material includes an increased annular part 12 which surrounds the hub 6 and embraces an upstanding flange 13 on the hub. The flange 13 provides a suitable housing in the hub for the nut 4, as is clearly illustrated in Figure 2.

The steering column 1 and sleeve 5 are embraced by means of an insulated cap 14 which is provided with a comparatively wide upper surface at its upper end and embedded within this insulated cap on this upper surface is the innermost rail 15 and the two outer rails 16 and 16'. This construction is similar to that disclosed in Patent # 1,769,517, which shows the construction of the circuit closure, and it will be noted that the inner rail 15 is connected to a battery 17, and by means of conductor 18 and conductor 19, the battery is connected up to the lamps 20 and 20'. The lamp 20 is connected by means of conductor 21 to rail 16, while lamp 25 is connected to rail 16' by a conductor 21'.

The hub 6 is provided at opposite points with cutouts, or guide ways 22, and slidably mounted therein are the insulating blocks 23. Embedded in the lower faces of these blocks are the contact balls 24, normally seated in recesses 25 in the upper face of the insulating cap 14, as illustrated at the right hand side of Figure 2. Connected to the blocks 23 are the rods 26 which extend out through opposite spokes 9 and connect to the inner ends of control levers 27 which are pivotally mounted in the spokes 9 at opposite sides of the hub.

The insulating blocks 23 can be quickly moved inwardly in the cutouts 22 until the balls 24 bridge the inner and outer trackways for completing a circuit to either of the lamps 20 or 20'. In Figure 2, the insulating blocks 23 at the left, is shown in its innermost position with the ball 24 bridging the outer rail 16' and the inner rail 15, thus closing a circuit to lamp 20. The insulating blocks 23 are retained in their lowermost position by means of spring members 28, the inner ends of which are connected to the sleeve 5, as shown at Figure 2, while the outer ends bear against the upper surfaces of blocks 23 for retaining them in position.

In Figure 3, it will be noted that the inner ends of the sectional spokes are bolted through the medium of bolts 29 to the annular flange 30 on the hub 6. Attention is also directed to the fact that the insulating cap 14 is connected to the column 1 by means of a set screw 31 which will prevent rotative movement on the part of the insulating cap relative to the column and the sleeve 5. The reduced upper end 32 on the sleeve 5 is provided for a portion of its circumference with ratchet teeth 33 adapted to be engaged by a ratchet face on an adjustable block 34, slidably mounted with a recess 35 in the hub 6. Attached to block 34 is an adjustable screw bolt 36 movable in a threaded recess which extends transversely of the hub and opens onto the exterior thereof, whereby the block 34 may be adjusted toward or away from the ratchet teeth 33.

In a great many instances, when applying the steering wheel to the post, it is rather difficult to line up the control levers 27 upon opposite sides of the post and furthermore, if there is no particular means provided for retaining the steering wheel in proper position with respect to the post, the control levers will have a tendency to get out of alignment and be moved out of a convenient position for the driver. It is, therefore, the principal object of block 34 and ratchet teeth 33 to retain the steering wheel against movement relative to the steering post after the wheel has been properly adjusted so that the control levers are in convenient position to be actuated by the driver.

The block 34 is securely held in engagement with the ratchet teeth 33 by means of an adjustable screw bolt 37, the inner end of which is provided with a cam surface 38 adapted to engage the block 34, as shown in Figure 1, so as to securely retain block 34 in locking position.

The sleeve 5 is keyed to the steering post by means of a longitudinal key 39 carried by the post and engaging in a keyway 40 in the sleeve, so that rotative movement of the sleeve 5 will be imparted to post 2.

It will be apparent from the foregoing that the construction embodied in the accompanying drawings is a decided improvement over the construction illustrated in my Patent #1,769,517, granted July 1, 1930, and in this improved construction, the steering wheel can be quickly and easily adjusted so as to properly place the levers in a convenient position for the driver and through constant use of the device, should the levers become removed from their position they can be easily returned to this position through the medium of the block 34 and ratchet teeth 33.

Another feature of this construction is the fact that the steering wheel including the spokes and hand rim is formed of two separable pieces that may be bolted or otherwise connected together and coated with a composition covering, thus not only providing a comparatively efficient steering wheel, but one which can be manufactured and placed on the market at a very low cost.

I claim:

1. In an automobile steering wheel mechanism, including a steering post, a stationary column surrounding the post, a sleeve secured on the upper end of said post, and a steering wheel provided with a hub mounted on said sleeve; a flanged cap carried by said column and surrounding said sleeve, cooperating mechanism carried by said steering wheel hub and said cap, and means for locking said hub on said sleeve in various selective positions.

2. In an automobile steering wheel mechanism, including a steering post, a stationary column surrounding the post, a sleeve secured on the upper end of said post, and a steering wheel provided with a hub mounted on said sleeve; a flanged cap carried by the said column and surrounding said sleeve cooperating mechanisms carried by said steering wheel hub and said cap, a sliding block carried by said hub and engaging the peripheral surface of said sleeve to lock said hub in relative adjusted position on said sleeve, and manually operable means for actuating said block to release or lock the same.

3. In an automobile steering wheel mechanism, including a steering post, a stationary column surrounding said post, a sleeve secured on the upper end of said post and abutting the end of said column, a steering wheel provided with a hub rotatably mounted on said sleeve, a flanged cap carried by said column and surrounding said sleeve, cooperating mechanisms carried by said steering wheel hub and said cap, and means for locking said hub on said sleeve in various selective positions.

4. In an automobile steering wheel mechanism, a steering post, a stationary column surrounding said steering post, a sleeve secured on the upper end of said post and abutting the upper end of said column, the said sleeve being provided with a reduced upper end to provide a shoulder, the reduced portion having a serrated surface, a flange provided on the lower end of said sleeve, a steering wheel provided with a hub surrounding said sleeve and supported upon its upper shoulder, a sliding block carried by said hub and provided with a serrated face for engagement with the serrated face of said sleeve, manually operable means carried by said hub for reciprocating said block, a flanged cap carried by said column, said cap surrounding said sleeve and being supported by its lower flange, and cooperating mechanisms carried by said steering wheel hub and said cap.

In testimony that I claim the foregoing I have hereunto set my hand at Waukegan, in the county of Lake and State of Illinois.

MATHEW G. IVANDICK.